United States Patent
Chang et al.

(10) Patent No.: US 12,316,429 B2
(45) Date of Patent: May 27, 2025

(54) METHODS AND APPARATUS AND MACHINE-READABLE MEDIA RELATING TO AIRBORNE WIRELESS DEVICES

(71) Applicant: Telefonaktiebolaget LM Ericsson (publ), Stockholm (SE)

(72) Inventors: Peiliang Chang, Åkersberga (SE); Sholeh Yasini, Sundbyberg (SE); Torbjörn Wigren, Uppsala (SE); Richard Wiren, Vantaa (FI); Juhani Kauppi, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 700 days.

(21) Appl. No.: 17/597,616

(22) PCT Filed: Jul. 15, 2019

(86) PCT No.: PCT/SE2019/050692
§ 371 (c)(1),
(2) Date: Jan. 13, 2022

(87) PCT Pub. No.: WO2021/010873
PCT Pub. Date: Jan. 21, 2021

(65) Prior Publication Data
US 2022/0376770 A1    Nov. 24, 2022

(51) Int. Cl.
*H04B 7/185* (2006.01)
*H04W 24/08* (2009.01)

(52) U.S. Cl.
CPC ........ *H04B 7/18502* (2013.01); *H04W 24/08* (2013.01)

(58) Field of Classification Search
CPC .......................... H04B 7/18502; H04W 24/08
See application file for complete search history.

(56) References Cited

U.S. PATENT DOCUMENTS

| | | | |
|---|---|---|---|
| 11,869,236 B1 * | 1/2024 | Callari | .................. G06F 16/583 |
| 2008/0233967 A1 | 9/2008 | Montojo et al. | |
| 2016/0381596 A1 | 12/2016 | Hu et al. | |

(Continued)

FOREIGN PATENT DOCUMENTS

| | | |
|---|---|---|
| EP | 3462646 A1 | 4/2019 |
| WO | 2017/198696 A2 | 11/2017 |
| WO | 2019004925 A1 | 1/2019 |

OTHER PUBLICATIONS

International Search Report and Written Opinion for Application No. PCT/SE2019/050692, Mar. 20, 2020, 12 pages.

(Continued)

*Primary Examiner* — Abdullahi Ahmed
(74) *Attorney, Agent, or Firm* — Nicholson De Vos Webster & Elliott LLP

(57) ABSTRACT

A method performed by a node in a wireless communication network. The method comprises obtaining measurement data for one or more measurements performed, by a wireless device in the wireless communication network, on at least one first radio signal transmitted by one or more base stations in the wireless communication network. The method further comprises determining whether or not the wireless device is airborne by inputting the measurement data to a model developed using a machine learning algorithm.

17 Claims, 10 Drawing Sheets

(56) References Cited

U.S. PATENT DOCUMENTS

| | | | |
|---|---|---|---|
| 2018/0152909 A1* | 5/2018 | Hanes | G01S 5/0294 |
| 2018/0308013 A1 | 10/2018 | O'Shea | |
| 2019/0202463 A1* | 7/2019 | Anderson | B60W 30/06 |
| 2019/0313317 A1* | 10/2019 | Murphy | H04W 64/006 |
| 2019/0357066 A1* | 11/2019 | Kim | H04W 24/10 |
| 2020/0187151 A1* | 6/2020 | Wang | H04W 36/0058 |
| 2020/0220612 A1* | 7/2020 | Thomas | H04B 17/345 |
| 2021/0051595 A1* | 2/2021 | Rico Alvarino | H04W 52/283 |
| 2021/0084447 A1* | 3/2021 | Rydén | H04W 4/029 |
| 2021/0160721 A1* | 5/2021 | Panchal | H04W 24/02 |
| 2021/0168725 A1* | 6/2021 | Muruganathan | H04W 52/146 |
| 2022/0189326 A1* | 6/2022 | Hamminga | G01S 13/72 |

OTHER PUBLICATIONS

Henrik Ryden et al., "Rogue Drone Detection: A Machine Learning Approach," 2019, 6 pages, IEEE Wireless Communications and Networking Conference (WCNC).

3GPP TS 6.331 V8.20.0, "3rd Generation Partnership Project; Technical Specification Group Radio Access Network; Evolved Universal Terrestrial Radio Access (E-UTRA); Radio Resource Control (RRC); Protocol specification (Release 8)," Jun. 2013, 216 pages, 3GPP Organizational Partners.

Communication pursuant to Article 94(3) EPC, EP App. No. 19745322.8, May 14, 2024, 3 pages.

First Office Action, CN App. No. 201980098467.5, Nov. 30, 2023, 23 pages (11 pages of English Translation and 12 pages of Original Document).

International Preliminary Report on Patentability, PCT App. No. PCT/SE2019/050692, Jan. 27, 2022, 9 pages.

Notice of Allowance, CN App. No. 201980098467.5, Jun. 19, 2024, 09 pages (05 pages of English Translation and 04 pages of Original Document).

Second Office Action, CN App. No. 201980098467.5, Apr. 4, 2024, 20 pages (11 pages of English Translation and 9 pages of Original Document).

* cited by examiner

METHODS AND APPARATUS AND MACHINE-READABLE MEDIA RELATING TO AIRBORNE WIRELESS DEVICES

CROSS-REFERENCE TO RELATED APPLICATIONS

This application is a National stage of International Application No. PCT/SE2019/050692, filed Jul. 15, 2019, which is hereby incorporated by reference.

TECHNICAL FIELD

Embodiments of the present disclosure relate to communication networks, and particularly to methods, apparatus and machine-readable media for determining whether or not a wireless device in a communication network is airborne.

BACKGROUND

Unmanned Aerial Vehicles (UAVs) are increasingly being used for a diverse range of civilian applications. UAVs may be provided with the capability to connect to base stations in wireless communication networks in order to increase their range of operation, enhance security and improve communication quality. Once airborne, a UAV is more likely to have a line-of-sight radio link with a serving base station in a communication network, allowing for improved link quality between the airborne UAV and its serving base station. However, as a result of their elevation, airborne UAVs are also more likely to have an uninterrupted line-of-sight to neighbouring base stations, which means that airborne UAVs may be exposed to increased interference from neighbouring cells, and may also be more likely to generate interference for neighbouring cells. The impact of interference on and generated by airborne UAVs may be mitigated by using interference management techniques that are adapted for airborne devices, such as, for example, beamforming.

However, a communication network may only be able to implement these specialist interference management techniques for wireless devices that are identified as being airborne. A special subscription or registration type can be adopted for aerial devices, such as UAVs, to allow them to be identified as such by the network. However, non-aerial wireless devices (i.e. wireless devices not designed for airborne operation) may also be mounted to UAVs to communicate with a communication network. As these non-aerial communication devices would not be associated with the special subscription type, the communication network would not be able to recognise such a UAV as an aerial device.

Further, the use of a subscription type would only serve to indicate whether a device is capable of airborne operation, as a subscription type would not distinguish between a grounded aerial device and an airborne aerial device. Accordingly, if subscription types alone are used to classify devices as airborne, then the specialist interference management techniques designed for airborne devices may be inadvertently applied to grounded airborne devices, and may not be applied to airborne devices that communicate using a communication device that was not designed for aerial use.

SUMMARY OF INVENTION

Embodiments of the present disclosure seek to address these and other problems.

In a first aspect, the present disclosure provides a method performed by a node in a wireless communication network. The method comprises obtaining measurement data for one or more measurements performed, by a wireless device in the wireless communication network, on at least one first radio signal transmitted by one or more base stations in the wireless communication network. The method further comprises determining whether or not the wireless device is airborne by inputting the measurement data to a model developed using a machine learning algorithm.

Apparatus and machine-readable media are also provided for performing the method set out above. For example, in one aspect there is provided a node comprising processing circuitry and a machine-readable medium storing instructions which, when executed by the processing circuitry, cause the node to obtain measurement data for one or more measurements performed, by a wireless device in the wireless communication network, on at least one first radio signal transmitted by one or more base stations in the wireless communication network. The node is further caused to determine whether or not the wireless device is airborne by inputting the measurement data to a model developed using a machine learning algorithm.

In another aspect there is provided a machine-readable medium. The machine-readable medium stores instructions which, when executed by processing circuitry of a node, cause the node to obtain measurement data for one or more measurements performed, by a wireless device in the wireless communication network, on at least one first radio signal transmitted by one or more base stations in the wireless communication network. The node is further caused to determine whether or not the wireless device is airborne by inputting the measurement data to a model developed using a machine learning algorithm.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
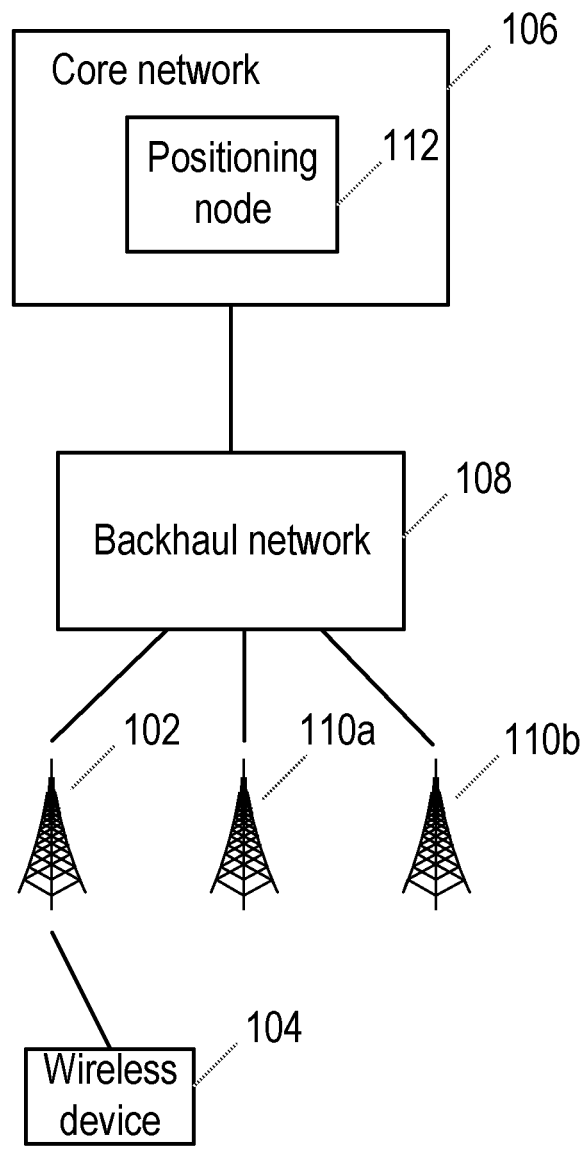
FIG. 1 is a schematic diagram of a communication network according to embodiments of the disclosure.

FIG. 1 shows a wireless communication network 100 according to embodiments of the disclosure. The wireless communication network 100 may implement any suitable wireless communications protocol or technology, such as Global System for Mobile communication (GSM), Wide Code-Division Multiple Access (WCDMA), Long Term Evolution (LTE), New Radio (NR), WiFi, WiMAX, or Bluetooth wireless technologies. In one particular example, the network 100 forms part of a cellular telecommunication network, such as the type developed by the 3$^{rd}$ Generation Partnership Project (3GPP). Those skilled in the art will appreciate that various components of the network 100 are omitted from FIG. 1 for the purposes of clarity.

The wireless communication network 100 comprises a base station 102 in communication with a wireless device 104. The wireless device 104 is connected to a core network 106 via the base station 102 and a backhaul network 108. In addition to the base station 102 (referred to as the serving base station 102), the wireless communication network 100 further comprises two neighbouring base stations 110a, 110b (collectively 110). A neighbouring base station may be a base station other than the serving base station 102 that is detectable by the wireless device 104. Although two neighbouring base stations 110 are shown, those skilled in the art will appreciate that the network 100 may contain any number of neighbouring base stations 110.

The core network 106 comprises a positioning node 112. The positioning node 112 may be, for example, an Evolved Serving Mobile Location Centre (ESMLC). The positioning node 112 may be configured to receive positioning information for wireless devices (e.g. cell identity information for a cell detected by a wireless device) in the wireless communication network 100. The positioning node 112 may be configured to estimate the position of a wireless device based on received positioning information.

As discussed above, airborne wireless devices are more likely to have line-of-sight radio links with their serving base stations. Thus, in the wireless communication network 100, if the wireless device 104 is airborne, it may have an uninterrupted line-of-sight with its serving base station 102, providing a higher quality link to the network 100. However, it may also have an uninterrupted line-of-sight with one or more of the neighbouring base stations 110, leading to increased interference. Specialist interference management techniques for airborne devices may be implemented to mitigate this interference (e.g. beamforming techniques). However, without accurate and efficient methods for determining whether a wireless device is airborne, there is a risk that these interference management techniques may be inadvertently applied to grounded wireless devices, or may not be applied to airborne wireless devices.

Thus, improved methods are needed for determining whether wireless devices are airborne.

According to embodiments of the disclosure, radio measurements performed by a wireless device are used to determine whether the wireless device is airborne. For example, one aspect provides a method performed by a node in a wireless communication network. The node obtains measurement data for one or more measurements performed by a wireless device in the wireless communication network. The measurements are performed on at least one first radio signal transmitted by one or more base stations in the wireless communication network. The measurement data are input to a model developed using a machine learning algorithm to determine whether or not the wireless device is airborne.

Embodiments of the disclosure therefore provide methods for efficiently and accurately identifying airborne wireless devices. In particular embodiments, the model is utilized to obtain classification scores indicating a likelihood that the wireless device is airborne, minimising the memory and processing required to determine whether a wireless device is airborne.

Figure 2:
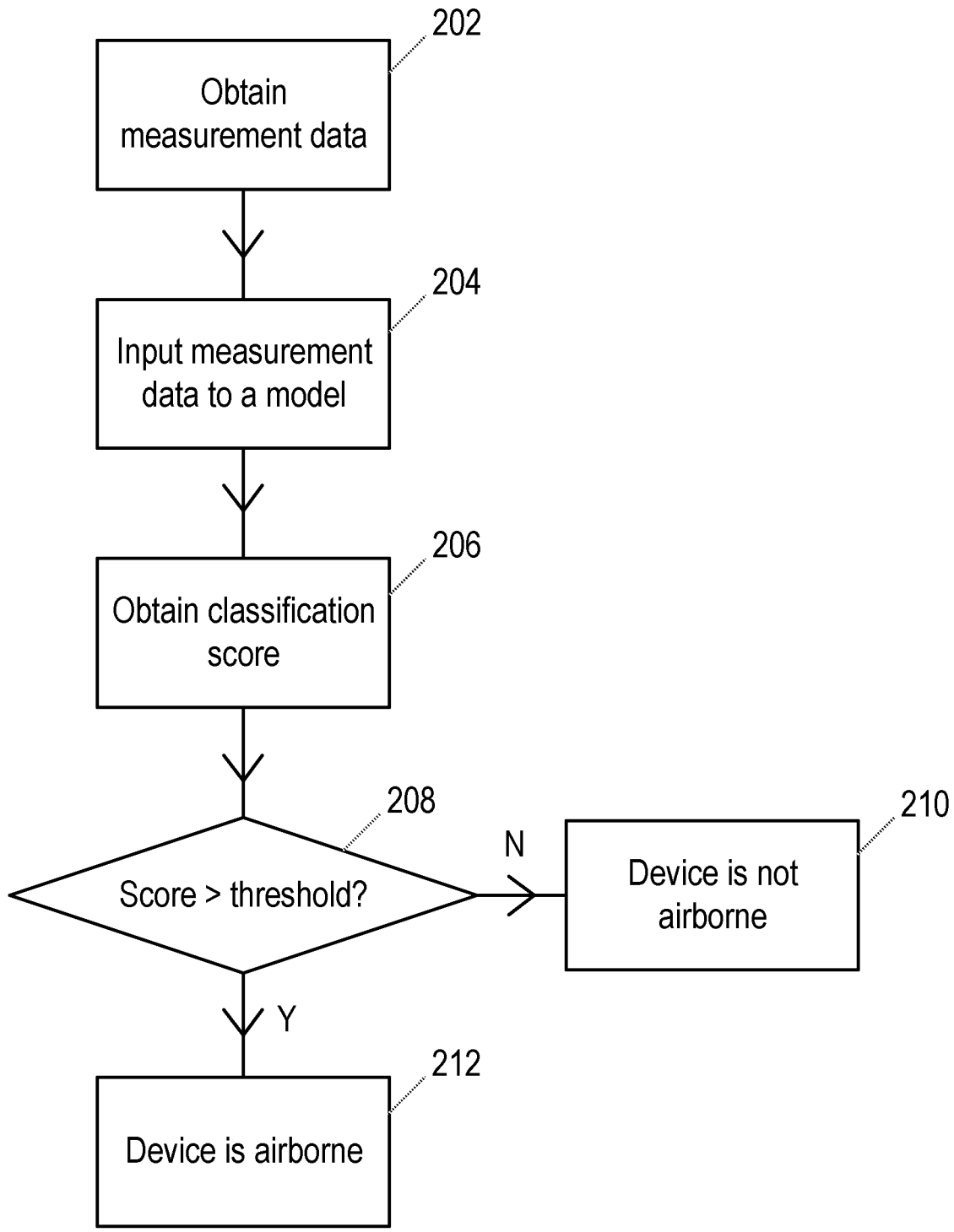
FIG. 2 is a flowchart of a method according to embodiments of the disclosure.

FIG. 2 is a flowchart of a method performed by a node in a wireless communication network for determining whether or not a wireless device in the network is airborne. The wireless communication network may comprise the wireless communication network 100 illustrated in FIG. 1, for example. The wireless device may be the wireless device 104 illustrated in FIG. 1. The node may be a base station (such as the serving base station 102 or one of the neighbouring base stations 110), or any other node in the wireless communication network 100. For example, the first network node may be a node in the core network 106 (such as, for example, the positioning node 112 illustrated in FIG. 1) or a node coupled to the backhaul network 108.

The method begins in step 202, in which the node obtains measurement data for one or more measurements performed by the wireless device 104 on at least one first radio signal transmitted by one or more base stations in the wireless communication network 100. The one or more base stations may comprise a serving base station of the wireless device (such as, for example, the serving base station 102) and/or one or more neighbouring base stations (such as, for example, the neighbouring base stations 110).

The node may receive the measurement data from the wireless device 104 (e.g., in one or more measurement reports transmitted by the wireless device 104 to its serving base station 102).

Alternatively, in embodiments in which the method is performed by the wireless device 104 itself, step 202 may comprise performing the one or more measurements on the at least one first radio signal.

The measurement data may comprise any suitable measurement data for distinguishing between airborne and grounded wireless devices. The measurement data may comprise a number of cells detected by the wireless device 104. For example, the wireless device may receive a radio signal from only one base station (e.g. its serving base station 102), and may thus detect only one base station. Additionally or alternatively, the measurement data may comprise a number of neighbouring cells detected by the wireless device 104. That is, the measurement data may additionally or alternatively comprise a number of cells, other than the serving cell, detected by the wireless device.

The measurement data may comprise one or more of: a received power of the at least one first radio signal and a received signal quality of the at least one first radio signal. The at least one first radio signal may be transmitted by the serving base station 102 of the wireless device 104, so that the received power and/or received signal quality is the received power and/or received signal quality of the serving cell. Additionally or alternatively, the at least one first radio signal may comprise one or more radio signals transmitted by neighbouring base stations 110. Thus the received power and/or received signal quality may comprise the received power and/or received signal quality of one or more neighbouring cells.

The received power may be measured, for example, from a reference signal transmitted by the one or more base stations, in which case the received power may be known as a reference signal received power (RSRP). Such reference signals may comprise cell-specific reference signals (CRSs) or other suitable reference signals. The wireless device may be configured (e.g. by the serving base station 102) to measure the RSRP for reference signals transmitted by the serving base station and any neighbouring cells, and to report the measured values to the serving base station 102.

Similarly, the received signal quality may also be measured, for example, using a reference signal transmitted by the one or more base stations, in which the received signal quality is known as a reference signal received quality (RSRQ). Again, such reference signals may comprise cell-specific reference signals (CRSs) or other suitable reference signals. In one example, the reference signal received quality is calculated based on the RSRP, as a ratio of the RSRP to another radio measurement, such as the received signal strength indicator (RSSI). The wireless device may be configured (e.g. by the serving base station 102) to measure the RSRQ for reference signals transmitted by the serving base station and any neighbouring cells, and to report the measured values to the serving base station 102.

The wireless device 104 may be configured to measure the received power (e.g. the RSRP) and/or the received signal quality (e.g. the RSRQ) of the serving base station 102 and/or neighbouring base stations as part of performance management (PM) initiated wireless device measurements. The wireless device 104 may receive a configuration message from the serving base station 102 (e.g., a Radio Resource Control message) indicating the measurements to be performed by the wireless device 104, i.e. a measurement configuration. The configuration message may indicate that the wireless device 104 is to perform intra- or inter-frequency measurements. In one example, the configuration message comprises an indication that the wireless device 104 is to perform intra-frequency measurements (e.g., measurements on the same carrier frequency as that of the serving base station). The configuration message may indicate a maximum number of cells to be measured by the wireless device 104. In one example, the configuration message indicates that the wireless device should measure the RSRP and the RSRQ of the serving base station 102. The configuration message may, for example, include one or more of the information elements described in Section 6.3.5 of the 3GPP document TS 36.331 V8.20.0. The wireless device 104 may perform the measurements indicated in the configuration message. The wireless device 104 may send a report of the measurements to the serving base station 102 (e.g. as part of a further RRC message).

The measurement data may comprise a variance in received signal power of one of the one or more base stations. Thus, the measurement data may comprise an indication of a change (or lack of change) in the received signal power over time. For example, the measurement data may comprise a standard deviation of the received signal power or the square of the standard deviation of the received signal power. The variance may be measured over a predetermined time window (e.g. 1 minute). In particular embodiments, the variance in received signal power is the variance in the received signal power of the serving base station 102.

The measurement data may comprise a difference between a received signal power of the serving base station 102 and a received signal power of one of the at least one neighbouring base stations 110, such as a maximum received signal power of a neighbouring base station. That is, in some embodiments, only the received signal power of the neighbouring base station with the highest (or strongest) received signal power is used. Thus, for example, the measurement data may comprise the difference (or gap) between the RSRP of the serving cell and the strongest neighbouring cell. If no neighbouring cell is detected, then the received signal power of the neighbouring cell may be set to a predetermined value (e.g. −140 dB).

Those skilled in the art will appreciate that the measurement data may comprise one or more, or all of the types of measurement data described above in any combination. The different types of measurement data may be referred to as different attributes, such that, for example a number of cells detected by the wireless device is considered to be an attribute.

The method then proceeds to step 204, in which the obtained measurement data are inputted to a model developed using a machine learning algorithm. Those skilled in the art will appreciate that there are any number of machine learning algorithms that may be suitable for developing the model, including, for example, logistic regression, decision tree, random forest, isolation forest, support vector machine, k-nearest neighbours and neural networks, and the present disclosure is not limited as such.

In one embodiment, the model is developed using a logistic regression algorithm. In such a model, the relationship between the input measurement data, $x_i$, and the probability that the wireless device is airborne, P, is given by:

$$\ln\frac{P}{1-P} = \beta_0 + \sum_{i=1}^{N}\beta_i x_i,$$

where $\beta_0$ is an intercept, and $\beta_i$ are the model coefficients for the N input attributes $x_i$, where i=1,2, ... N. The probability that the wireless device is airborne may therefore be expressed as $$P = \frac{1}{1+e^{-\beta_0-(\sum_{i=1}^{N}\beta_i x_i)}}.$$

The larger the value of P, the more likely that the wireless device is airborne.

TABLE 1

| Attribute | Value_range | Score |
|---|---|---|
| Number of detected cells (N_Count) | [0.0-1.0] | −0.68 |
| | [2.0-3.0] | −0.34 |
| | [4.0-4.0] | −0.21 |
| | [5.0-7.0] | 1.15 |
| | [8.0-8.0] | 2.51 |
| RSRP of serving cell (RSRP_Serving) | (−∞-−93.0] | −1.81 |
| | (−93.0-−85.3] | −0.11 |
| | (−85.3-∞) | 1.14 |
| Variance in RSRP for the serving cell (RSRP_Tstd) | [0.0-0.485] | −1.74 |
| | (0.485-1.6] | 1.05 |
| | (1.6-12.5] | 1.40 |
| RSRQ of serving cell (RSRQ_Serving) | (−∞-−11.5] | 0.67 |
| | (−11.5-−10.5] | 0.36 |
| | (−10.5-−8.2] | 0.07 |
| | (−8.2-−7.5] | −0.22 |
| | (−7.5-−2.5] | −1.18 |

TABLE 1-continued

| Attribute | Value_range | Score |
| --- | --- | --- |
| Difference between RSRP of serving cell and strongest neighbouring cell (RSRP_Gap) | (−∞-5.4]<br>(5.4-∞) | 1.33<br>−1.32 |
| Intercept ($\beta_0$) | | −1.84 |

The model coefficients and the intercept are used to develop a classification scorecard, such as the scorecard shown in Table 1. Further details regarding the development of the model and the associated classification scorecard are provided below in respect of FIG. 8.

Returning to FIG. 2, step 204 may thus comprise comparing the measurement data to the classification scorecard shown in Table 1 to obtain a score for each measured attribute. Thus for example, if the measurement data comprises the values for the attributes shown in Table 2 below, then each attribute will be assigned the associated score shown in the final column of Table 2.

In step 206, a classification score is obtained. In the illustrated embodiment, the individual scores for each attribute that are obtained in step 204 are combined (e.g., through summation) to obtain an overall classification score. Thus, in the aforementioned example, the total classification score is −1.76.

TABLE 2

| Attribute | Value | Score |
| --- | --- | --- |
| Number of detected cells (N_Count) | 4.0 | −0.21 |
| RSRP of serving cell (RSRP_Serving) | −95.0 | −1.81 |
| Variance in RSRP for the serving cell (RSRP_Tstd) | 0.44 | −1.74 |
| RSRQ of serving cell (RSRQ_Serving) | −14.5 | 0.67 |
| Difference between RSRP of serving cell and strongest neighbouring cell (RSRP_Gap) | (−∞-5.4] | 1.33 |
| Total | | −1.76 |

The method then proceeds to step 208, in which the total classification score is compared to a first threshold. The first threshold may be predetermined at the node, or received at the node from another node of the network, such as a core network node. The determination of the first threshold is discussed in more detail below.

If the total classification score compares unfavorably to (e.g., is less than) the first threshold, then the method proceeds to step 210, in which the wireless device is determined not to be airborne.

If the score compares favourably to (e.g., is greater than) the first threshold, then the method proceeds to step 212, in which the wireless device 104 is determined to be airborne.

In response to the determination that the wireless device 104 is airborne, the method may further comprise initiating the application of interference management techniques that are specific to airborne devices to the wireless device 104. For example, if the method is performed by the serving base station 102, then the serving base station 102 may determine to use beamforming for future communications with the wireless device 104. Alternatively, if the method is performed in a node in the core network 106, then the method may further comprise initiating the application of such interference management techniques for the wireless device 104 by the serving base station 102 (e.g., through the transmission of suitable control messages to the serving base station 102).

Embodiments of the disclosure thus provide a method for determining whether a wireless device is airborne.

A further application of embodiments of the disclosure relates to the detection of unmanned aerial vehicles. As noted above, unmanned aerial vehicles are increasingly being used for a range of applications. Existing solutions for detecting unmanned aerial vehicles use specialist equipment such as, for example, radar systems, cameras, infra-red search and track systems (I RST) or acoustic detectors. These systems can often be costly, preventing their deployment on large scales.

Further aspects of the disclosure provide methods for determining whether a wireless device is borne by an unmanned aerial vehicle. Unmanned aerial devices typically travel at lower speeds than other airborne wireless devices (e.g. a mobile phone being used on an aeroplane). Therefore, once a wireless device is determined to be airborne (using, for example, the method outlined above in relation to FIG. 2) the speed of the wireless device may be used to infer whether or not the wireless device is borne by an unmanned aerial vehicle.

For a wireless device moving at speed v relative to a base station, the frequency of radio signals transmitted at a carrier frequency $f_0$ between the base station and the wireless device will be shifted by a carrier frequency offset $\Delta f$, $$\Delta f = \frac{v}{c} f_0,$$

where c is the speed of light in the transmission medium (i.e. air). Thus, measurements of the carrier frequency offset for radio signals transmitted between the wireless device and the base station may be used to infer the speed of the wireless device. As unmanned aerial devices typically travel at lower speeds than other airborne wireless devices (e.g. a mobile phone being used on an aeroplane), the carrier frequency offset may be used to determine whether a wireless device is an unmanned aerial vehicle.

Accordingly, in some aspects of the disclosure, the method performed by a node described above in respect of FIG. 2 further comprises obtaining a carrier frequency offset for a second radio signal transmitted between the wireless device 104 and one of the one or more base stations. The carrier frequency offset is equal to the difference between a measured frequency of the received second radio signal and the expected carrier frequency of the second radio signal. The carrier frequency offset may be obtained in response to determining that the wireless device is airborne in step 212.

The second radio signal may be received at the node (i.e. the node may be the wireless device 104 or the base station) and the carrier frequency offset may be calculated at the node based on measurements performed on the second radio signal by the node. Alternatively, the carrier frequency offset may be received at the node via signalling. For example, the method may be performed in a core network node and the core network node may receive the carrier frequency offset via signalling from the base station.

The second radio signal may be the first radio signal described above in relation to FIG. 2, or the second radio signal may be a different radio signal. The second radio signal may be a radio signal transmitted by the wireless device 104 and received by the base station, or the second radio signal may be a radio signal transmitted by the base station and received by the wireless device 104.

Once the carrier frequency offset has been obtained, the method further comprises determining whether or not the wireless device 104 is an unmanned aerial vehicle using the determined carrier frequency offset.

In one embodiment, the carrier frequency offset is compared to a second threshold, specific to the carrier frequency of the second radio signal, to determine whether or not the wireless device 104 is an unmanned aerial vehicle. For example, for a carrier frequency of 1.8 GHz, the second threshold may be 250 Hz (corresponding to a speed of 150 km/h). Thus, wireless devices with a carrier frequency offset below this threshold may be determined to be unmanned aerial vehicles, and devices with a carrier frequency offset above this threshold may be determined not to be unmanned aerial vehicles.

TABLE 3

| CFO (Hz) | Carrier Frequency | | |
|---|---|---|---|
| Speed (km/h) | 800 M Hz | 1.8 G Hz | 2.1 G Hz |
| 50 | 37 | 83 | 97 |
| 100 | 74 | 167 | 195 |
| 150 | 111 | 250 | 292 |
| 200 | 148 | 334 | 389 |
| 250 | 185 | 417 | 486 |
| 300 | 222 | 500 | 584 |

In alternative embodiments, a speed of the wireless device 104 is determined using the carrier frequency offset, and the speed is used to determine whether the wireless device is an unmanned aerial vehicle. In such embodiments, the speed of the wireless device 104 may be calculated according to the equation $$\Delta f = \frac{v}{c} f_0.$$

Alternatively, the carrier frequency offset may be compared to a look-up table or database to determine an estimated speed for the wireless device. The speed may be taken to be the speed listed in the look-up table or database with a carrier frequency offset that is closest to the measured value for the given carrier frequency. An example of such a table is provided in Table 3, which shows the carrier frequency offset for wireless devices travelling at various speeds transmitting at carrier frequencies of 800 MHz, 1.8 GHz and 2.1 GHz.

Thus, according to Table 3, the speed of a wireless device with a carrier frequency offset of 84 Hz for signals transmitted over a carrier frequency of 1.8 GHz is estimated as 50 km/h.

The speed of the wireless device 104 may then be compared to a threshold speed (such as 150 km/h, as above) to determine whether the wireless device is an unmanned aerial vehicle. A wireless device 104 with a speed below the threshold speed may be determined to be an unmanned aerial vehicle.

Therefore, embodiments of the disclosure also provide methods for detecting unmanned aerial vehicles. As described above, the methods for determining whether a wireless device is airborne rely upon a model which is developed using a machine learning algorithm. The model and its development will now be described in more detail.

Figure 6:
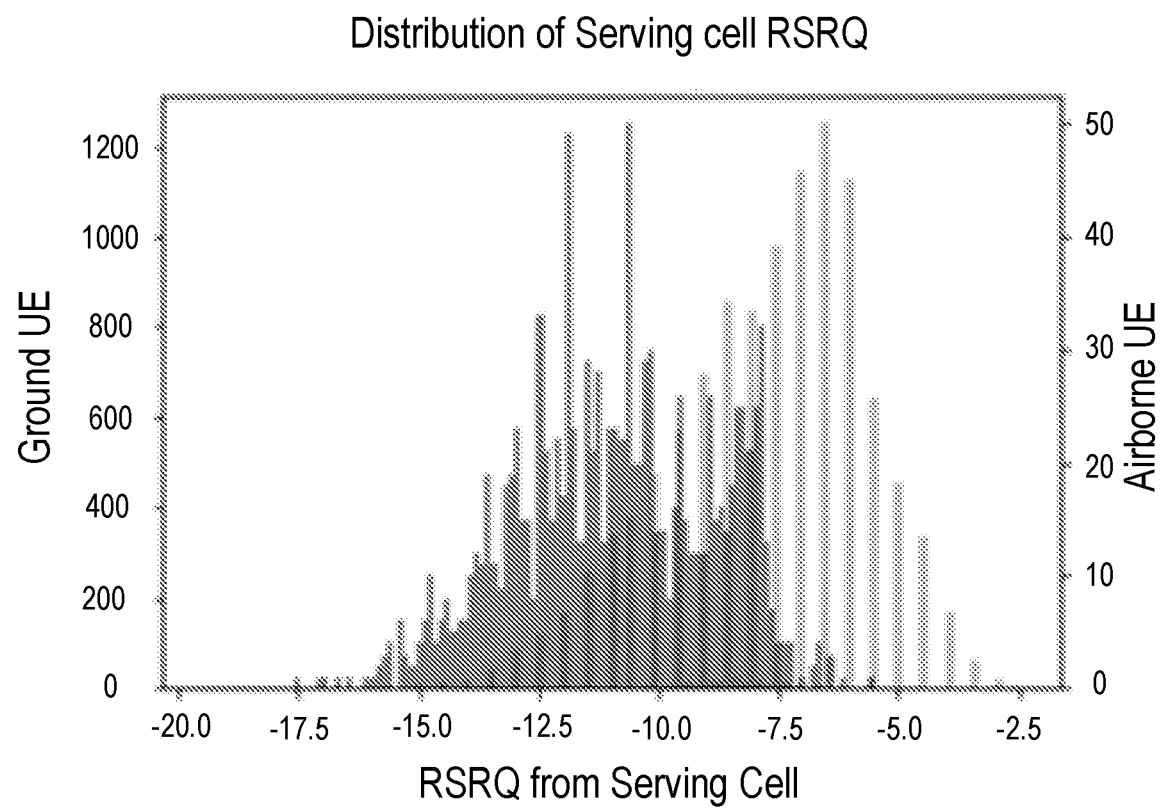
FIG. 6 is an illustration showing distributions of reference signal received quality (RSRQ) measurements performed by grounded and airborne wireless devices on serving cells.
Figure 7:
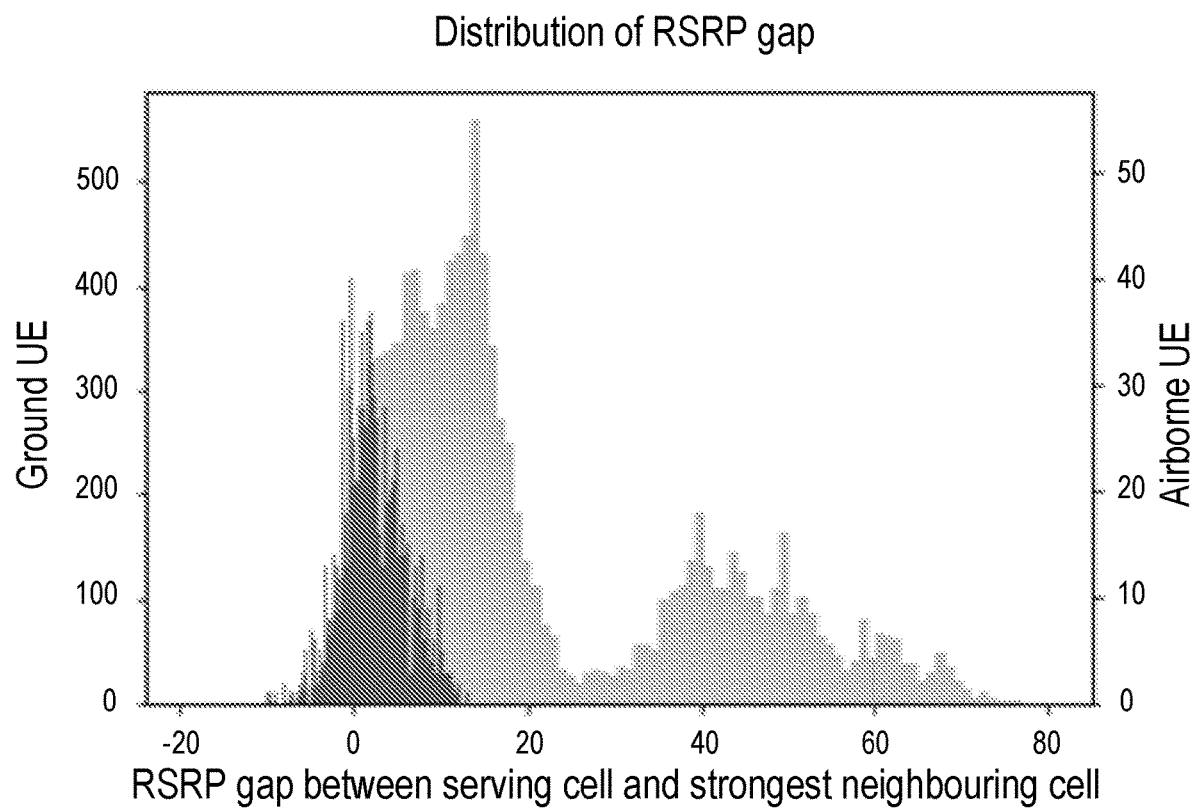
FIG. 7 is an illustration showing distributions of differences between RSRP measured for a serving cell and RSRP measured for a strongest neighbouring cell, as measured by grounded and airborne wireless devices.
Figure 8:
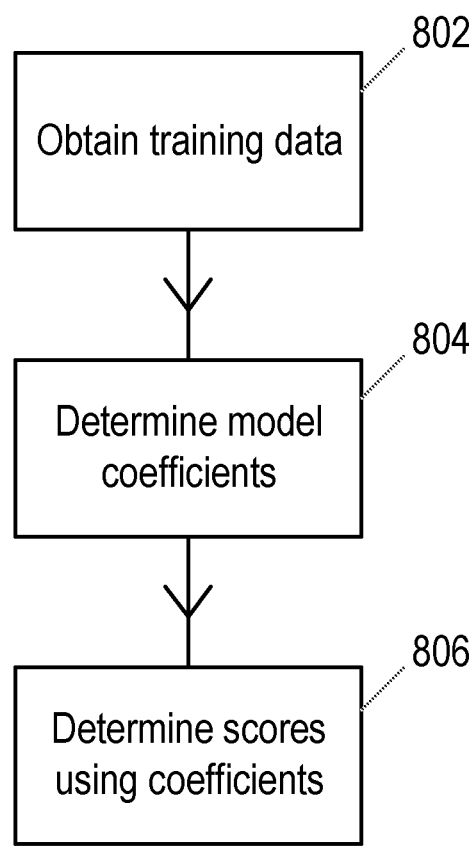
FIG. 8 is a flowchart of a method according to embodiments of the disclosure.

FIGS. 3-7 show examples of training data that may be used to train the model, and FIG. 8 describes a method of training the model according to embodiments of the disclosure.

FIG. 8 is a flowchart of a method according to further embodiments of the disclosure for training the model described above. The method may be performed by a node in a communication network. This may be the same node in which the model described in respect of FIG. 2 is implemented. However, the model may be trained in one node, and then distributed to different nodes to be used. Thus the method shown in FIG. 8 may also be performed by a different node to that which performs the method of FIG. 2.

The method begins in step 802, in which the node obtains training data. The training data comprises measurement data for measurements performed by a plurality of wireless devices. The plurality of wireless devices comprises at least one airborne wireless device and at least one grounded wireless device. The measurements are performed by the plurality of wireless devices on radio signals received from one or more base stations.

The measurement data comprises one or more candidate attributes (i.e. types of measurement data for measurements performed by wireless devices), such as, for example, one or more of all of the attributes described above in relation to FIG. 2 in any combination.

Figure 3:
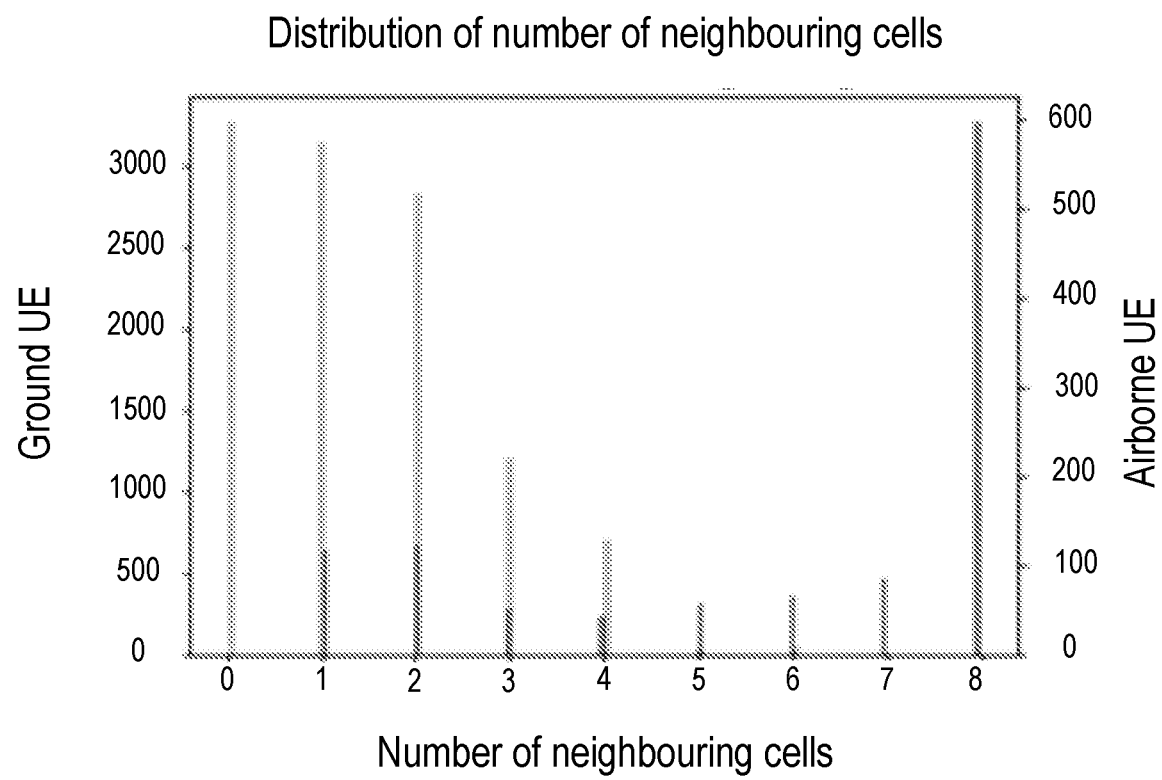
FIG. 3 is an illustration showing numbers of neighbouring cells detected by grounded and airborne wireless devices.
Figure 4:
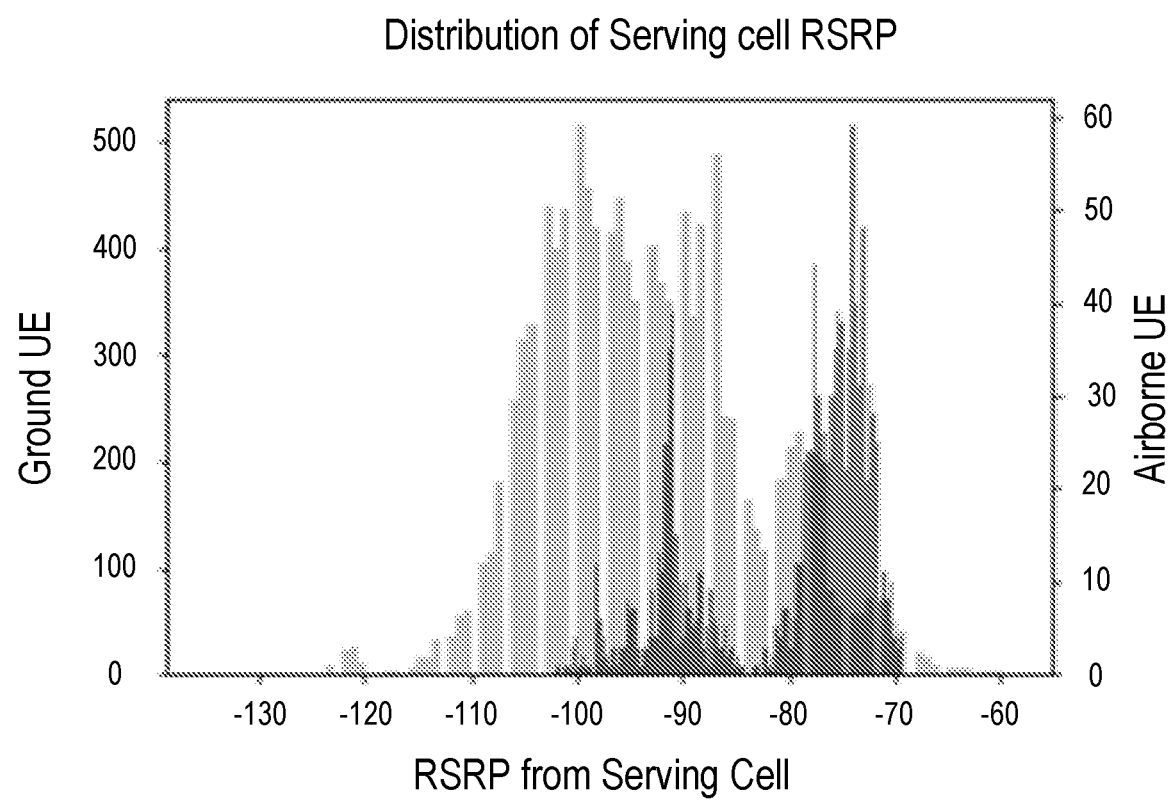
FIG. 4 is an illustration showing distributions of measurements of reference signal received power (RSRP) performed by grounded and airborne wireless devices.
Figure 5:
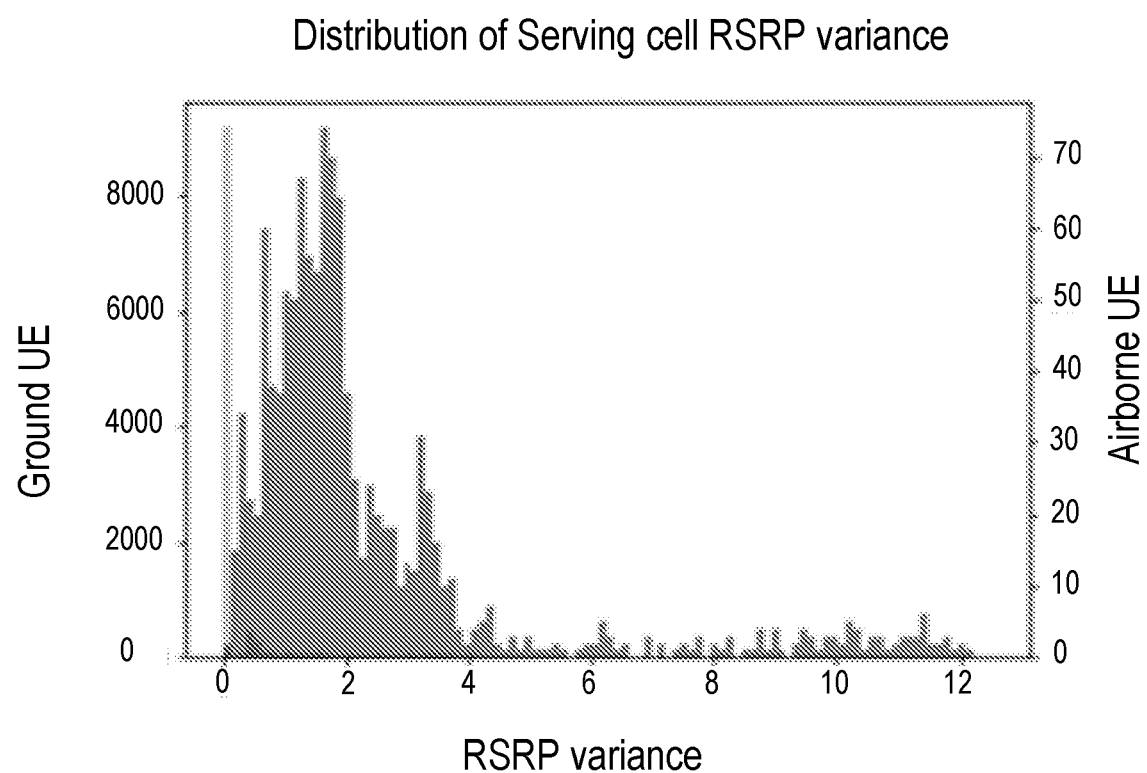
FIG. 5 is an illustration showing distributions of a variance in RSRP measurements performed by grounded and airborne wireless devices on serving cells.

FIGS. 3-7 are graphs showing example distributions of values of various candidate attributes measured by airborne and grounded wireless devices according to embodiments of the disclosure. FIG. 3 shows distributions of a number of detected neighbouring cells for airborne and wireless devices. In this context, a neighbouring cell detected by a wireless device is a cell other than a cell serving the wireless device. FIG. 4 shows distributions of the reference signal received power (RSRP) measured for radio signals received at wireless devices from their serving cells in dBm. FIG. 5 is an illustration showing the distribution of a variance in RSRP measured for radio signals received at wireless devices from their serving cells, in which the variance is given by a square of a standard deviation of the RSRP values measured by the wireless devices. FIG. 6 is an illustration showing a distribution of a reference signal received quality (RSRQ) for a serving cell. FIG. 7 is an illustration showing a distribution of a difference between an RSRP for serving cell and an RSRP for a strongest neighbouring cell. In each of these Figures, light-grey bars correspond to measurements by grounded wireless devices; mid-grey bars correspond to measurements by airborne wireless devices; and dark-grey bars show the superposition of data from airborne and grounded wireless devices.

In addition to the measurement data, the training data comprises identification for the measurement data, which indicates which of the data are from airborne wireless devices and which of the data are from grounded wireless devices. For example, each data point may be associated with a parameter or label indicating whether the measurement was made by an airborne or grounded wireless device.

In some embodiments, all of the candidate attributes are used. However, in other embodiments, the method comprises a preliminary processing step in which the node selects a subset of attributes from the candidate attributes. In such embodiments, in order to identify the subset of attributes, the node first calculates the information value of each candidate attribute as follows.

The measurement data are divided into discrete bins according to the values of the candidate attribute. For numerical data, the measurement data may be grouped into ordinal bins. For categorical data, the bins may be formed according to original values of the candidate attribute, with unique values of the attribute forming a bin. In some embodiments, any bin containing less than a threshold number of wireless devices is combined with another bin to form a larger combined bin to ensure that each bin is statistically meaningful. For example, in the case of a numerical attribute, a bin containing fewer than 1000 wireless devices may be combined with a subsequent bin to form a larger bin with more than 1000 wireless devices.

Once the bins are determined, the weight of evidence, $WoE_i$, for each bin i is calculated according to:

$$WoE_i = \ln \frac{Percentage_{airborne,i}}{Percentage_{grounded,i}},$$

in which $Percentage_{airborne,i}$ and $Percentage_{grounded,i}$ are the percentage of wireless devices in bin i that are airborne and grounded respectively. The information value, IV, of each attribute is then calculated using $$IV = \sum_{i=1}^{B} (Percentage_{airborne,i} - Percentage_{grounded,i}) * WoE_i,$$

where B is the total number of bins for that attribute. Candidate attributes with information values that are greater than or equal to a threshold value may then be selected (i.e. data for candidate attributes with information values less than the threshold value will be omitted from the training data). For example, candidate attributes with IV<0.2 may be discarded. Thus, only data corresponding to the desired subset of candidate attributes are included in the training data.

The remaining attributes and corresponding measurement data are transformed to a new format using the weight of evidence. For each remaining attribute $x_m$, a new attribute is created in the following way: the value of the new attribute for a given wireless device is equal to the weight of evidence of the bin where the value of $x_m$ of the considered wireless device falls in. The newly created attributes are then used for any subsequent calculations.

The list of attributes may be further reduced by checking the multi-collinearity among the newly created attributes, applying recursive attribute elimination and checking the statistical significance of the candidate attribute. The complexity of measuring and calculating the attributes may also be taken into account when reducing the attribute list. For example, attributes that are computationally expensive to calculate may be discarded.

Once the final list of attributes has been determined, in step 804 the measurement data for those attributes may be used to determine the model coefficients. A maximum likelihood algorithm may be used to determine the model coefficients. For example, the model may provide a relation between a number of attributes $x_i$ for a wireless device (i.e. inputs to the model) and a probability, $P(x_i)$ that the wireless device is airborne. For training data comprising input data, X, (e.g. measurement data for attributes) and outcomes, Y, (e.g. identification indicating which of the wireless devices are airborne) the model coefficients may be determined by maximising the conditional likelihood of obtaining the outcomes Y given the input data X, i.e. P[Y|X]. Any suitable maximum likelihood algorithm may be used, such as, for example, quasi-Newton, gradient descent etc.

As noted above, in a particular embodiment, the probability that a wireless device is airborne may be expressed as $$P = \frac{1}{1 + e^{-\beta_0 - (\sum_{i=1}^{N} \beta_i x_i)}},$$

where $\beta_0$ is an intercept, and $\beta_i$ are the model coefficients for the N input attributes $x_i$, where i=1,2, ... N. For a wireless device m with measurement data $x^m$ and identification $y^m$, the conditional likelihood of obtaining the outcome $y^m$ given the measurement data $x^m$ may be expressed as:

$$P(y^m|x^m) = y^m \frac{1}{1 + e^{-\beta_0 - (\sum_{i=1}^{N} \beta_i x_i^m)}} + (1 - y^m) \frac{e^{-\beta_0 - (\sum_{i=1}^{N} \beta_i x_i^m)}}{1 + e^{-\beta_0 - (\sum_{i=1}^{N} \beta_i x_i^m)}},$$

where $y^m=1$ for an airborne wireless device and $y^m=0$ for a grounded wireless device. For M independent samples (i.e. data for M wireless devices), the conditional likelihood of obtaining a set of outcomes Y (i.e. whether or not each of the M wireless devices are airborne) for input measurement data X may be expressed as:

$$P[Y|X] = \prod_{m=1}^{M} P(y^m|x^m) = \prod_{m=1}^{M} \left( y^m \frac{1}{1 + e^{-\beta_0 - (\sum_{i=1}^{N} \beta_i x_i^m)}} + (1 - y^m) \frac{e^{-\beta_0 - (\sum_{i=1}^{N} \beta_i x_i^m)}}{1 + e^{-\beta_0 - (\sum_{i=1}^{N} \beta_i x_i^m)}} \right),$$

where $x^m = \{x_0, \ldots x_N\}$ for N input measurement attributes. The coefficients $\beta_i$ (and the intercept, $\beta_0$) may then be estimated by maximising P[Y|X] (i.e. finding values of the coefficients and intercept that yield a value of P[Y|X] that is equal, or near to, 1).

In some embodiments, the coefficients $\beta_i$ are estimated by applying a maximization algorithm to the log-likelihood (i.e. by finding the coefficients $\beta_i$ that maximise lnP[Y|X]). For a model in which the probability that a wireless device is airborne is given by $$P = \frac{1}{1 + e^{-\beta_0 - (\sum_{i=1}^{N} \beta_i x_i)}},$$

the log-likelihood may be expressed as:

$$\ln(P[Y|X]) = \ln\left(\prod_{m=1}^{M}\left(y^m \frac{1}{1+e^{-\beta_0-(\Sigma_{i=1}^{N}\beta_i x_i^m)}} + (1-y^m)\frac{e^{-\beta_0-(\Sigma_{i=1}^{N}\beta_i x_i^m)}}{1+e^{-\beta_0-(\Sigma_{i=1}^{N}\beta_i x_i^m)}}\right)\right)$$

$$= \sum_{m=1}^{M} \ln\left(y^m \frac{1}{1+e^{-\beta_0-(\Sigma_{i=1}^{N}\beta_i x_i^m)}} + (1-y^m)\frac{e^{-\beta_0-(\Sigma_{i=1}^{N}\beta_i x_i^m)}}{1+e^{-\beta_0-(\Sigma_{i=1}^{N}\beta_i x_i^m)}}\right)$$

$$= \sum_{m=1}^{M}\left(y^m \ln\left(\frac{1}{1+e^{-\beta_0-(\Sigma_{i=1}^{N}\beta_i x_i^m)}}\right) + (1-y^m)\ln\left(\frac{e^{-\beta_0-(\Sigma_{i=1}^{N}\beta_i x_i^m)}}{1+e^{-\beta_0-(\Sigma_{i=1}^{N}\beta_i x_i^m)}}\right)\right)$$

$$= \sum_{m=1}^{M}\left(\ln\left(\frac{e^{-\beta_0-(\Sigma_{i=1}^{N}\beta_i x_i^m)}}{1+e^{-\beta_0-(\Sigma_{i=1}^{N}\beta_i x_i^m)}}\right) + y^m \ln\left(\frac{1}{1+e^{-\beta_0-(\Sigma_{i=1}^{N}\beta_i x_i^m)}} * \frac{1+e^{-\beta_0-(\Sigma_{i=1}^{N}\beta_i x_i^m)}}{e^{-\beta_0-(\Sigma_{i=1}^{N}\beta_i x_i^m)}}\right)\right)$$

$$= \sum_{m=1}^{M}\left(\ln\left(\frac{1}{1+e^{-\beta_0-(\Sigma_{i=1}^{N}\beta_i x_i^m)}}\right) + y^m\left(\beta_0 + \sum_{i=1}^{N}\beta_i x_i^m\right)\right)$$

Thus, for training data comprising inputs X (e.g. measurement data for one or more attributes) and outputs Y (e.g. identification for the measurement data), the intercept $\beta_0$ and model coefficients $\beta_i$ may be estimated by finding the coefficients that maximise the following log-likelihood function $$\ln(P[Y|X]) = \sum_{m=1}^{M}\left(\ln\left(\frac{1}{1+e^{\beta_0+(\Sigma_{i=1}^{N}\beta_i x_i^m)}}\right) + y^m\left(\beta_0 + \left(\sum_{i=1}^{N}\beta_i x_i^m\right)\right)\right).$$

Any suitable maximization algorithm may be used, including, for example, the Newton-Raphson method and other quasi-Newton methods.

In one embodiment, the Newton-Raphson method is used to determine the model coefficients. To illustrate this embodiment, the intercept and model coefficients are denoted $\beta \stackrel{\text{def}}{=} \{\beta_0, \beta_1, \beta_2, \ldots, \beta_N\}$ and the log-likelihood InP[Y|X] is denoted $$f(\beta) \stackrel{\text{def}}{=} f(\beta_0, \beta_1, \beta_2, \ldots, \beta_N) \stackrel{\text{def}}{=} \ln(P[Y|X]) =$$

$$\sum_{m=1}^{M}\left(\ln\left(\frac{1}{1+e^{\beta_0+(\Sigma_{i=1}^{N}\beta_i x_i^m)}}\right) + y^m\left(\beta_0 + \left(\sum_{i=1}^{N}\beta_i x_i^m\right)\right)\right).$$

$\beta$ is initialised with a random initial value $\beta^0$. The values of $\beta$ are then determined iteratively using:

$$\beta^{k+1} = \beta^k - H(\beta^i)^{-1}\nabla f(\beta^k),$$

where k is the iteration index that is initialised to k=0, $\nabla f(\beta^k)$ is the gradient of $f$ and $H(\beta^k)$ is a Hessian matrix of the function $f$. The iterative calculation of $\beta$ may continue until the values of $\beta$ converge (e.g. until subsequent iterations yield the same value of $\beta$ to within a predetermined tolerance or degree of precision).

In step 806, classification scores are determined using the model coefficients. For each of the final attributes, a score is assigned to each of its bins by multiplying the weight of evidence of that bin by the coefficient of the attribute. These scores are used to form a model, or scorecard (e.g. the scorecard shown in Table 1), for use in determining whether a wireless device is airborne.

As described above, the scorecard may be used in combination with a first threshold in order to determine whether a wireless device is airborne. The first threshold may be specific to the developed model. The first threshold may be determined by applying the developed model to, for example, the training data to assess the performance of the model. The performance of the model may be measured using one or more performance indicators, including, for example, a false-alarm rate (i.e. a false positive rate) and/or a miss-detection rate (i.e. a false negative rate). The false-alarm rate may be a ratio between the number of grounded wireless devices that are classified as airborne wireless devices and the total number of grounded wireless devices. The miss-detection rate may be a ratio between the number of airborne wireless devices that are determined to be grounded and the total number of airborne wireless devices. The higher the first threshold, the higher the miss-detection rate and the lower the false-alarm rate.

The first threshold may be determined in order to meet a desired miss-detection rate or a desired false-alarm rate. For example, given an upper bound of the miss-detection rate as $\chi$, the first threshold may be set as the $\chi$ percentile of the score for the wireless devices identified as being airborne. In another example, given the upper bound of the false-alarm rate, the first threshold may be set as the $(100-\chi)$ percentile of the score for wireless devices identified as being grounded.

Methods for updating the model are also provided. As described above, the model and associated scorecard are developed using a training data set. To improve the accuracy of the model, the scorecard, choice of attributes, bin group, weight of evidence and coefficients of the attributes may be updated using observation data.

Observation data and performance data for the model may be collected during use of the model (e.g., the scorecard). The observation data may comprise measurement data for one or more of the attributes included in the existing model. The observation data may, additionally or alternatively, comprise measurement data for one or more new attributes not considered in the existing model. The performance data indicates the performance of the existing model. For example, the performance data may comprise one or more of: a false-alarm rate, a miss-detection rate or any other suitable performance indicator. The performance data may be collected by comparing the determination made by the model (i.e. whether or not the wireless device is determined to be airborne) with a second data source. The second data source may be, for example, self-reporting by the wireless devices (e.g. if wireless devices report that they are airborne or grounded) or a subscription or registration type of the wireless devices.

The observation data and performance data may be used to determine whether or not to update the model. For example, if the performance data are deemed to be acceptable (e.g. the false-positive rates and/or false-negative rates are within predetermined ranges or compare favourably to threshold values), then it may be determined that the model should not be updated. In another example, if the observation data is deemed to contain too few records (e.g. so the data is not statistically significant), then it may be determined not to update the model. In a further example, if the performance data are deemed to be unacceptable (the false-positive rates and/or false-negative rates are not within predetermined ranges or are above threshold values), then the model may be updated.

The model may be updated by re-performing the steps outlined above in FIG. 8 for training the model using the observation data and the performance data, instead of the training data. For example, the bins for each attribute may be recreated, the information value for each attribute may be redetermined and the weight of evidence for each bin may be recalculated. The coefficients of the model attributes and thus the scorecard may then be updated using the observation data and the performance data.

Although the foregoing description (and, in particular, the description of FIG. 2) is provided in the context of a model developed using a logistic regression algorithm, those skilled in the art will appreciate that the model may be developed using any suitable machine learning algorithm and the present disclosure is not limited as such.

For example, in some embodiments, the model may be a decision tree model. A decision tree model comprises a set of nodes, which may be categorised as leaf nodes and non-leaf nodes. The leaf nodes have no child nodes while each non-leaf node has at least two child nodes. Each non-leaf node describes an if-else classification rule, which is defined by at least one attribute and some thresholds. Thus, a decision-tree model may describe a set of if-else rules. With such rules, input data can be deterministically classified into one of the outcomes. Thus, for example, a set of if-else rules may form a decision tree that may be used to determine whether a wireless device is airborne. The decision tree may be constructed using attributes such as, for example, the attributes or types of measurement data described above in respect of FIG. 2. The decision tree may be developed using training data, such as, for example, the training data described above in respect of FIGS. 3-8.

In another embodiment, an ensemble of decision trees (known as a random forest) may be used. Each tree may be the same as the decision tree described above and may thus describe a set of if-else rules. For a given sample to classify, one classification outcome may be obtained with each decision tree in the ensemble. The most frequent outcome of all the outcomes may be used as the final classification outcome. Multiple trees may be used to classify a wireless device as either airborne or grounded, giving a plurality of classification outcomes. Thus, for example, if the majority of the trees in the random forest determined the wireless device to be airborne, then the wireless device may be classified as airborne.

The random forest may be an isolation forest. Isolation forests may be used to identify outliers from a group of normal samples. An isolation forest model consists of an ensemble of binary decision trees. For one decision tree, each non-leaf node partitions the set of samples into subsets with one randomly selected attribute and a random split value between the maximum and the minimum value of the selected attribute. An assumption for the isolation forest model is that the outliers are rare and have different attribute distributions than the normal samples. Then the outliers require fewer partitions to become isolated. The leaves that contain the outliers are closer to the root of the tree than the normal samples, i.e., the lengths of the paths from the root to the outlier leaves are generally smaller than that of the paths from the root to the normal leaves.

An advantage of the isolation forest method is that it supports unsupervised learning. The model can be trained on the normal samples without any outlier samples in the training sample. In the context of the present application, airborne wireless devices may be considered as outliers, whilst grounded wireless devices may be considered as normal wireless devices, since airborne wireless devices are relatively rare compared to grounded wireless devices and airborne wireless device also have different radio propagation attributes than grounded wireless devices. Thus, an isolation forest may be used to develop a model for determining whether or not a wireless device is airborne even if data used to train the model does not comprise measurement data for any airborne wireless devices.

In other embodiments, the model may be developed using a support vector machine. Support vector machines are developed by placing labelled training data in a high-dimension space, which is defined by the attributes of the model. A hyperplane is then constructed in the space to separate the samples (i.e. the input data) with different labels. For a given sample to classify, the position of the considered sample in the high-dimension space is compared with the hyperplane to determine which outcome group the sample should be classified into. For example, the attributes (i.e. types of measurement data) described above in respect of FIG. 2 may be used to define the sample space. Training data (such as, for example, the training data described above in respect of FIG. 8) comprising measurement data from a plurality of wireless devices and identification information for the measurement data may be used to construct the hyperplane. The plurality of wireless devices comprises at least one airborne wireless device and at least one grounded wireless device. The identification information indicates which of the data are from the at least one airborne wireless device and which of the data are from the at least one grounded wireless device. Thus, the identification information may be used to construct the hyperplane and separate the airborne wireless devices from the grounded wireless devices.

In other embodiments, a K-nearest neighbours (KNN) model may be used. KNN models places labelled input data in a sample space, which is defined by the attributes of the model (e.g. the attributes or types of measurement data described above in respect of FIG. 2). The classification outcome of each sample in the input data is determined by its K nearest labelled neighbours in the sample space, where K is a predetermined integer. The classification outcome of the considered sample is the most frequent classification outcome of its K nearest labelled neighbours. Training data (such as, for example, the training data described above in respect of FIG. 8) comprising measurement data from a plurality of wireless devices and identification information for the measurement data may be used to define the sample space.

In other embodiments, neural networks may be used. A neural network is composed of neuron nodes and the connections among the nodes. The nodes may be grouped into three types of layers: an input layer, one or more hidden layers and an output layer. The input layer consists of input nodes, which are the model attributes (e.g. the attributes or types of measurement data described above in respect of FIG. 2). Each attribute uses one node. The hidden layers include one or more layers, in which each layer consists of multiple nodes and each node applies a non-linear transformation to the weighted sum of the outputs of the prior layer and feeds the transformation result to the next layer. The output layer nodes summarises the output of the hidden layers and outputs the classification results.

Figure 9:
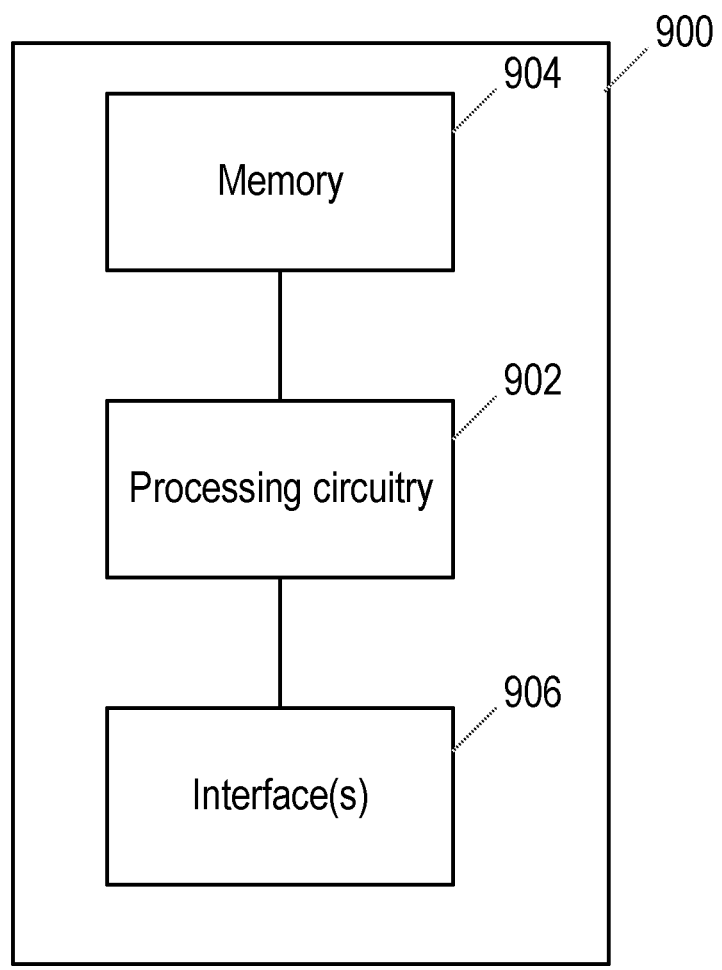
FIGS. 9 and 10 are schematic diagrams of a node according to embodiments of the disclosure.

FIG. 9 is a schematic diagram of a node 900 according to embodiments of the disclosure. The node 900 may be configured to perform the methods described above, including the methods described with respect to FIGS. 2 and/or 8. The node 900 may be, for example, a core network node or a base station.

The node 900 comprises processing circuitry 902 (such as one or more processors, digital signal processors, general purpose processing units, etc), a machine-readable medium 904 (e.g., memory such as read-only memory (ROM), random-access memory, cache memory, flash memory devices, optical storage devices, etc) and one or more interfaces 906.

According to embodiments of the disclosure, the machine-readable medium 904 stores instructions which, when executed by the processing circuitry 902, cause the node 900 to: obtain measurement data for one or more measurements performed, by a wireless device in the wireless communication network, on at least one first radio signal transmitted by one or more base stations in the wireless communication network; and determine whether or not the wireless device is airborne by inputting the measurement data to a model developed using a machine learning algorithm.

The one or more interfaces 906 may comprise hardware and/or software suitable for communicating with other nodes of the wireless communication network using any suitable communication medium. For example, the interfaces 106 may comprise one or more wired interfaces, using optical or electrical transmission media. Such interfaces may therefore utilize optical or electrical transmitters and receivers, as well as the necessary software to encode and decode signals transmitted via the interface. In a further example, the interfaces 106 may comprise one or more wireless interfaces. Such interfaces may therefore utilize one or more antennas, baseband circuitry, etc. The components are illustrated coupled together in series; however, those skilled in the art will appreciate that the components may be coupled together in any suitable manner (e.g., via a system bus or suchlike).

In further embodiments of the disclosure, the node 900 may comprise power circuitry (not illustrated). The power circuitry may comprise, or be coupled to, power management circuitry and is configured to supply the components of node 900 with power for performing the functionality described herein. Power circuitry may receive power from a power source. The power source and/or power circuitry may be configured to provide power to the various components of node 900 in a form suitable for the respective components (e.g., at a voltage and current level needed for each respective component). The power source may either be included in, or external to, the power circuitry and/or the node 900. For example, the node 900 may be connectable to an external power source (e.g., an electricity outlet) via an input circuitry or interface such as an electrical cable, whereby the external power source supplies power to the power circuitry. As a further example, the power source may comprise a source of power in the form of a battery or battery pack which is connected to, or integrated in, the power circuitry. The battery may provide backup power should the external power source fail. Other types of power sources, such as photovoltaic devices, may also be used.

Although FIG. 9 shows the processing circuitry 902, the memory 904 and the interface(s) 906 coupled together in series, those skilled in the art will appreciate that the components of the node 900 may be coupled together in any suitable manner (e.g. via a bus or other internal connection).

Figure 10:
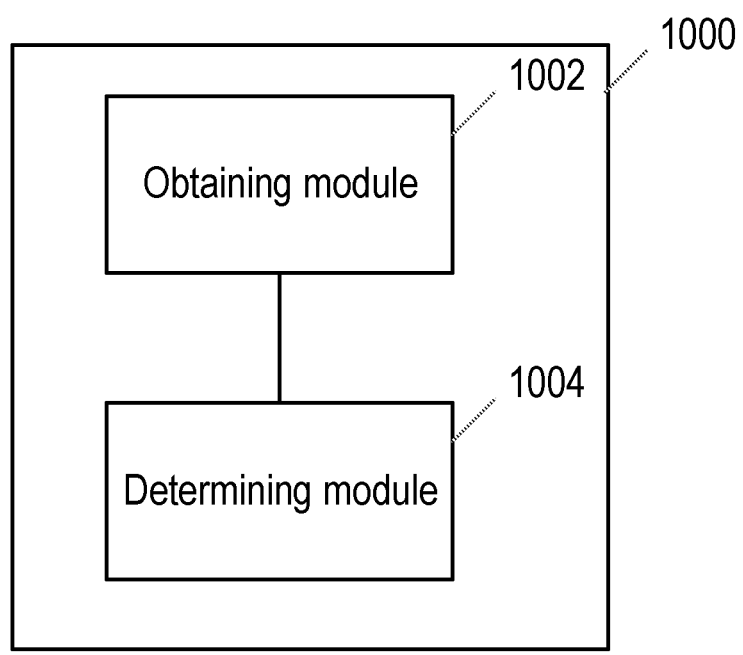

FIG. 10 is a schematic illustration of a node 1000 according to further embodiments of the disclosure. The node 1000 may be configured to perform the methods described above, including the methods described with respect to FIGS. 2 and/or 8. The node 1000 may be, for example, a core network node or a base station.

The node 1000 comprises an obtaining module 1002. The obtaining module 1002 is configured to obtain measurement data for one or more measurements performed, by a wireless device in the wireless communication network, on at least one first radio signal transmitted by one or more base stations in the wireless communication network.

The node 1000 further comprises a determining module 1004, which is configured to determine whether or not the wireless device is airborne by inputting the measurement data to a model developed using a machine learning algorithm.

The term "module" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The present disclosure therefore provides methods, apparatus and machine-readable mediums for determining whether a wireless device is airborne. Specifically, a model developed using a machine learning algorithm is used to determine whether a wireless device is airborne based on measurement data for measurements performed by the wireless device on radio signals transmitted by a base station.

It should be noted that the above-mentioned embodiments illustrate rather than limit the concepts disclosed herein, and that those skilled in the art will be able to design many alternative embodiments without departing from the scope of the appended following statements. The word "comprising" does not exclude the presence of elements or steps other than those listed in a statement, "a" or "an" does not exclude a plurality, and a single processor or other unit may fulfil the functions of several units recited in the statements. Any reference signs in the statements shall not be construed so as to limit their scope.

The invention claimed is:

1. A method performed by a node in a wireless communication network, the method comprising:
   obtaining measurement data for one or more measurements performed, by a wireless device in the wireless communication network, on at least one first radio signal transmitted by a serving base station and one or more neighbouring base stations in the wireless communication network; and
   determining whether or not the wireless device is airborne by inputting the measurement data to a model developed using a machine learning algorithm, wherein the model is developed using training data comprising:
      measurement data obtained from at least one airborne wireless device and at least one grounded wireless device on the at least one first radio signal transmitted by the serving base station and one or more neighbouring base stations; and identification information for the measurement data, indicating which of the measurement data are from the at least one airborne wireless device and which of the measurement data are from the at least one grounded wireless device.

2. The method according to claim 1, wherein determining whether or not the wireless device is airborne further comprises:
obtaining, from the model, a classification score indicating a likelihood that the wireless device is airborne.

3. The method according to claim 2, wherein determining whether or not the wireless device is airborne further comprises:
comparing the classification score to a first threshold to determine whether or not the wireless device is airborne.

4. The method according to claim 1, wherein the machine learning algorithm is a logistic regression algorithm.

5. The method according to claim 1, wherein the measurement data comprise a number of cells detected by the wireless device.

6. The method according to claim 1, wherein the measurement data comprise one or more of: a received power of the at least one first radio signal and a received signal quality of the at least one first radio signal.

7. The method according to claim 1, wherein the measurement data comprise a variance in received signal power of the serving base station.

8. The method according to claim 1, wherein the measurement data comprise a difference between a received signal power of the serving base station and a received signal power of the one or more neighbouring base stations.

9. The method according to claim 8, wherein the received signal power of the one or more neighbouring base stations is a maximum received signal power.

10. The method according to claim 1, further comprising:
obtaining a carrier frequency offset for a second radio signal transmitted between the wireless device and one of the serving base station and one or more neighbouring base stations, wherein the carrier frequency offset is indicative of a velocity of the wireless device; and
determining whether or not the wireless device is an unmanned aerial vehicle using the carrier frequency offset.

11. The method according to claim 10, wherein determining whether or not the wireless device is an unmanned aerial vehicle using the carrier frequency offset comprises:
comparing the carrier frequency offset to a second threshold to determine whether or not the wireless device is an unmanned aerial vehicle, wherein the second threshold is specific to a carrier frequency of the second radio signal.

12. The method according to claim 1, wherein the node is the serving base station, or the node is a core network node in the wireless communication network.

13. A node in a wireless communication network comprising:
processing circuitry; and
a storage medium storing instructions which, when executed by the processing circuitry, cause the node to:
obtain measurement data for one or more measurements performed, by a wireless device in the wireless communication network, on at least one first radio signal transmitted by a serving base station and one or more neighbouring base stations in the wireless communication network; and
determine whether or not the wireless device is airborne by inputting the measurement data to a model developed using a machine learning algorithm, wherein the model is developed using training data comprising:
measurement data obtained from at least one airborne wireless device and at least one grounded wireless device on the at least one first radio signal transmitted by the serving base station and one or more neighbouring base stations; and
identification information for the measurement data, indicating which of the measurement data are from the at least one airborne wireless device and which of the measurement data are from the at least one grounded wireless device.

14. The node according to claim 13, wherein to determine whether or not the wireless device is airborne further comprises the node to obtain, from the model, a classification score indicating a likelihood that the wireless device is airborne.

15. The node according to claim 14, wherein to determine whether or not the wireless device is airborne further comprises the node to compare the classification score to a first threshold to determine whether or not the wireless device is airborne.

16. The node according to claim 13, wherein the machine learning algorithm is a logistic regression algorithm.

17. A non-transitory machine-readable storage medium storing instructions which, when executed by processing circuitry of a node in a wireless communication network, cause the node to perform operations comprising:
obtaining measurement data for one or more measurements performed, by a wireless device in the wireless communication network, on at least one first radio signal transmitted by a serving base station and one or more neighbouring base stations in the wireless communication network; and
determining whether or not the wireless device is airborne by inputting the measurement data to a model developed using a machine learning algorithm, wherein the model is developed using training data comprising:
measurement data obtained from at least one airborne wireless device and at least one grounded wireless device on the at least one first radio signal transmitted by the serving base station and one or more neighbouring base stations; and
identification information for the measurement data, indicating which of the measurement data are from the at least one airborne wireless device and which of the measurement data are from the at least one grounded wireless device.

* * * * *